United States Patent
Bruchmann

(10) Patent No.: US 9,461,445 B2
(45) Date of Patent: Oct. 4, 2016

(54) FUSED BUSBAR ADAPTER

(71) Applicant: Klaus Bruchmann GmbH, Weisskirchen an der Traun (AT)

(72) Inventor: Klaus Bruchmann, Coburg (DE)

(73) Assignee: Klaus Bruchmann GmbH, Weisskirchen an der Traun (AT)

(*) Notice: Subject to any disclaimer, the term of this patent is extended or adjusted under 35 U.S.C. 154(b) by 78 days.

(21) Appl. No.: 14/524,181

(22) Filed: Oct. 27, 2014

(65) Prior Publication Data

US 2015/0124379 A1 May 7, 2015

(30) Foreign Application Priority Data

Oct. 28, 2013 (DE) .......... 10 2013 111 857

(51) Int. Cl.
*H02B 1/18* (2006.01)
*H02B 1/21* (2006.01)
*H02B 1/20* (2006.01)

(52) U.S. Cl.
CPC ........ *H02B 1/18* (2013.01); *H02B 1/20* (2013.01); *H02B 1/21* (2013.01)

(58) Field of Classification Search
None
See application file for complete search history.

(56) References Cited

U.S. PATENT DOCUMENTS

| | | | |
|---|---|---|---|
| 7,520,776 B2 * | 4/2009 | Wagener .......... | H02B 1/21 439/532 |
| 7,601,013 B2 * | 10/2009 | Wagener .......... | H02B 1/21 439/110 |
| 2012/0068808 A1 * | 3/2012 | Darr .......... | H01H 9/104 337/201 |
| 2013/0040494 A1 * | 2/2013 | Mische .......... | H05K 1/0263 439/620.26 |
| 2014/0254115 A1 * | 9/2014 | Kioski .......... | H04Q 1/15 361/752 |

FOREIGN PATENT DOCUMENTS

| | | |
|---|---|---|
| DE | 29705224 U1 | 6/1997 |
| DE | 10104516 A1 | 8/2002 |
| DE | 102007044390 B3 | 2/2009 |
| EP | 0 762 583 A2 | 3/1997 |

OTHER PUBLICATIONS

German Office Action dated Aug. 13, 2014 for the German Priority Application Serial No. 102013111857.7.

* cited by examiner

*Primary Examiner* — Courtney Smith
(74) *Attorney, Agent, or Firm* — Wood, Phillips, Katz, Clark & Mortimer

(57) ABSTRACT

A busbar adapter is provided with a first contact connection and a second contact connection for connecting two busbars, a fuse unit having a first fuse holder and a second fuse holder, and a housing structure for accommodating the fuse unit and the first and second contact connections. The first and the second fuse holders releasably retain a first and second fuse. A first supply lead of the first fuse and the first contact connection are connected after inserting the first fuse into the first fuse holder. A second supply lead of the second fuse and the second contact connection are connected after inserting the second fuse into the second fuse holder. The housing structure has insulating walls arranged such that a first current path of the first fuse is isolated from a second current path of the second fuse.

8 Claims, 11 Drawing Sheets

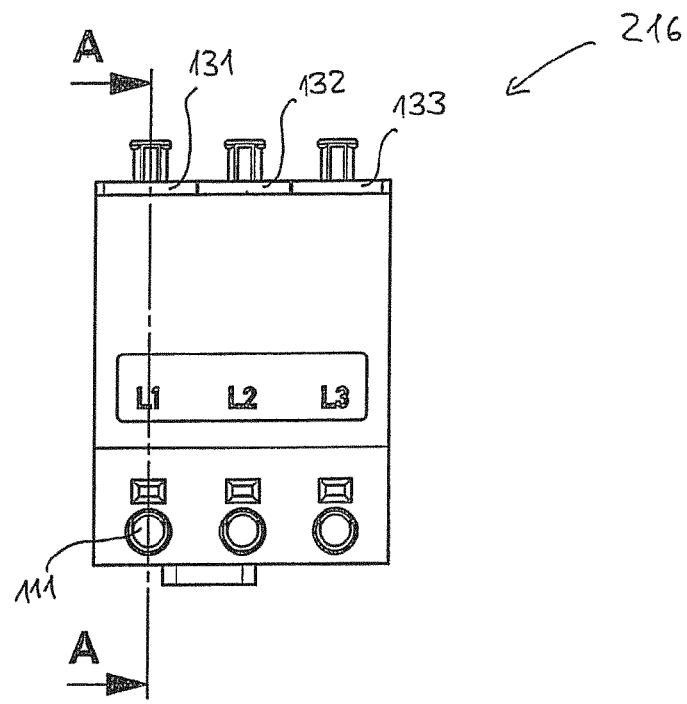
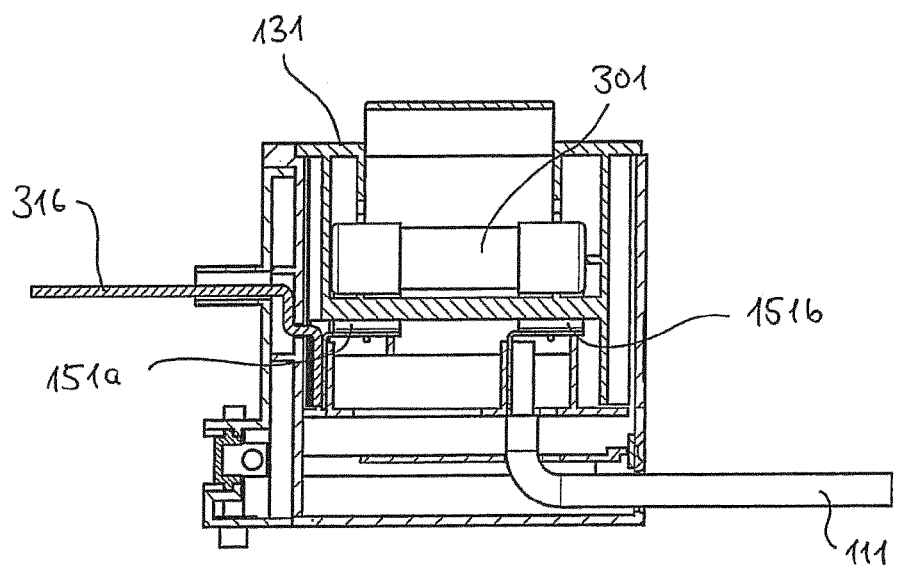
Fig. 11

US 9,461,445 B2

FUSED BUSBAR ADAPTER

FIELD OF THE INVENTION

The present invention relates to a busbar adapter and in particular a busbar adapter having an integrated fuse unit for protecting current paths to connected appliances.

BACKGROUND OF THE INVENTION

Busbar adapters are in particular suitable for fastening electrical installation appliances on electrical busbar systems used for power supply. Here, busbars are designed in particular for very high current intensities for simultaneously supplying several appliances with sufficient power. For example, currents of up to 630 A (or even more) are available on busbar systems. So that these high current intensities can be transmitted, busbars exhibit a corresponding cross section (for example 30×10 mm$^2$) and are fused correspondingly.

Toward the connected appliances, the supply leads have correspondingly smaller dimensions (for example having cross sections of 4-6 mm$^2$), since markedly smaller current intensities are required there (e.g. 20 . . . 30 A). Since the total current intensity available on a busbar would destroy the appliances, the appliances are fused separately for the case of a short circuit. The appropriate fuses are often appliance-specific or directly integrated into the appliances. These fuses therefore do not offer any protection for a short circuit on a (cable) connection from the busbar to the appliances.

It is therefore the object of the present invention to further increase the safety of busbar systems.

BRIEF SUMMARY OF THE INVENTION

This object is achieved by a busbar adapter according to one or more of the claims.

Corresponding to the present invention, a busbar adapter for contacting at least a first and a second busbar using at least a first fuse and a second fuse comprises the following features: at least a first supply lead and a second supply lead; at least a first contact connection and a second contact connection for producing a connection to the at least two busbars; a fuse unit having at least a first fuse holder and a second fuse holder and a housing structure for accommodating the fuse unit and the first and second contact connections. The first and second fuse holders are designed for keeping the first fuse and the second fuse releasable, so that the first supply lead and the first contact connection are connected after inserting the first fuse into the first fuse holder, for providing a first current path, and the second supply lead and the second contact connection are connected after inserting the second fuse into the second fuse holder, for providing a second current path. The housing structure exhibit insulating walls that are designed such that the first current path is isolated from the second current path.

The housing structure can for example be of one-part, two-part or three-part design so that the individual parts of the housing structure are connected to each other via connecting structures such as, for example, locking devices.

As an example, the insulating walls are designed parallel to the current paths and divide the housing structure into chambers in which the current paths extend. For example, no or only indirect connections are formed between the chambers, so that no bridging the current paths by a straight article (e.g. a screwdriver) is possible in the housing structure. As an option, no or only very small holes or openings are designed in the insulating walls so that no conductive connection can be produced between the current paths even if an article is introduced. The insulating walls can extend in particular in parallel to the likewise parallel contact connections. As an option, the insulating walls are likewise designed in the fuse unit for providing chambers there for the current paths, advantageously again no direct connections existing between the current paths. For example, straight connections can be regarded as direct connections in this context (if for example the current paths are in eye contact to each other).

As an option, the fuse unit further exhibits at least one withdrawable slider that is designed to withdraw the first fuse and/or the second fuse out of the fuse unit to thereby interrupt the first and/or the second current paths. The withdrawable slider is, for example, a first slider for withdrawing the first fuse, and the fuse unit can further exhibit a second slider for withdrawing the second fuse, it being possible to withdraw the first and second sliders independently of each other to thereby interrupt the first and second current path independently of each other.

The withdrawable slider(s) offer the advantage that as a result it is possible to easily exchange the first and/or the second fuses, since by withdrawing on the one hand the current paths are interrupted and on the other hand the fuses are easily accessible for a user.

As an option, the busbar adapter exhibits at least one light signaling device that is designed to emit a light signal if the first and/or the second fuses is/are defective. The light signal can change color for example in the case of a defect, be switched on or be switched off. The light signaling device can, for example, be an LED device having a multiplicity of LEDs that provides a light signal for each of the supply leads that are formed, if the corresponding fuse is no longer intact and has to be replaced. As an option, it is likewise possible to indicate via the light signaling device when a voltage is applied to the contact connections.

As an option, the busbar adapter further exhibits a third supply lead, a third contact connection, and a third fuse holder. The third fuse holder is, for example, designed to keep a third fuse releasable, so that the third supply lead and the third contact connection are connected after inserting the third fuse into the third fuse holder, to provide a third current path. The third current path connects the third supply lead to the third contact connection, the third current path being isolated from the first current path and also from the second current path at least partly by at least one of the insulating walls of the housing structure.

The first, second and third fuses can be conventional standard fuses that are selected corresponding to the current load that is to be expected on the supply leads or for which the supply leads are designed (for example, as a result of the cross section for the supply leads). The fuses themselves are here not necessarily part of the inventive matter but can correspondingly be inserted as standard components into busbar adapter.

Busbar adapters are often of multi-part design and exhibit at least an upper and a lower deck. This construction makes it difficult to integrate a fuse unit directly into the busbar adapter, since in general the upper deck can be removed from the lower deck upward and integration into the lower deck or into the upper deck is not possible in the case of conventional busbar systems. This problems is solved by the invention in that the fuse unit of the busbar adapter is formed laterally next to the upper-deck element (in a plane that is formed by the busbars) and is part of the lower-deck element. To make it possible despite this that the upper-deck element can be fastened to the lower-deck element, the upper and lower-deck elements exhibit at least one locking device that can exhibit for example projections and openings that engage in each other when the upper and the lower decks are connected to each other. The optional locking device then latches the upper and the lower-deck element such that the projections cannot move out of the openings that are formed on the upper and lower decks, as long as the locking device is in the locking position.

According to further exemplary embodiments, the housing structure therefore exhibits an upper-deck element, a lower-deck element, and a locking device. The locking device is designed to lock the upper-deck element and the lower-deck element with each other, the upper-deck element being designed to fasten electrical appliances thereto and the lower-deck element being designed to provide an electrical connection to the first and second busbars. As an option, the locking device is further designed to prevent a parallel or anti-parallel shift of the lower-deck element and the upper-deck element relative to each other. The fuse unit is, for example, formed in the lower-deck element, the upper-deck element being arranged laterally next to the fuse unit.

In the present application, the term "lateral" refers to the plane in which the busbars lie, so that elements that are shifted in this plane can also be denoted as laterally next to each other.

As an option, the locking device exhibits a locking slider that is designed to lock the lower-deck element and the upper-deck element with each other, the locking device optionally further exhibiting a spring that pretensions the locking slider into its locking position.

In the case of further exemplary embodiments the housing structure exhibits an upper deck and a lower deck and is designed to interconnect the upper deck between the lower deck and the fuse deck. The busbar adapter can in turn exhibit a locking device that is designed for connecting the upper deck, the lower deck, and the fuse deck to each other.

As an option, the fuse deck exhibits at least a first contact element and a second contact element. Accordingly, the upper-deck element and the lower-deck element exhibit openings for accommodating and immobilizing therein the first contact element and the second contact element.

The housing structure can further exhibit a switch-locking mechanism that is designed to fasten the fuse deck to the upper-deck element and the lower-deck element by the first contact element and the second contact element into the openings of the upper-deck element and/or of the lower-deck element. Here the first current path extends from the first supply lead via the first fuse via the first contact element to the first contact connection and the second current path from the second supply lead via the second fuse, the second contact element to the second contact connection. As an option, the first and second contact elements can exhibit a part insulating and reinforcing sleeve to thereby insulate the current paths additionally as far as possible.

As an option, the upper deck, the lower deck, and the fuse deck can be jointly locked and unlocked via the switch-locking mechanism.

As an option, the busbar adapter further exhibits a support rail that is designed for fastening electrical appliances thereto in different positions on the upper-deck element of the busbar adapter.

As an option, the first, second and third fuse holders in each case exhibit a first contact, and the first, second and third contact connections are in each case integrally designed with the first contact of the first, second and third fuse holders (i.e. as a unit). Therefore, the first contact of the first (or second or third) fuse holder is of one-part design with the first (or second or third) contact connection.

Exemplary embodiments of the present invention exhibit a number of advantages. For example, the fuse deck can likewise be used for conventional busbar systems, since the contact elements can be inserted into the existing contact openings and can be immobilized on to the upper and lower deck via a latching mechanism. As an option, the fuse deck can be attached to the upper deck via an additional immobilizing mechanism. As in the case of the previously mentioned exemplary embodiments, the supply leads are of analogous design.

Thus the inventive busbar adapter further solves the problem of reliably protecting busbar systems, and to be specific also for the case that the busbar system is of multi-part design due to an upper and a lower deck. This objective is achieved in that the fuse unit is shifted laterally to the upper-deck element and a locking device is provided to correspondingly lock the upper and lower-deck elements. As an option, the busbar adapter exhibits signaling devices such as, for example, LED units that signal if a fuse is defective and has to be replaced.

Using the inventive busbar adapter, a reliable protection of busbar systems is provided, the busbars for example permitting current intensities of up to and more than 630 A and exhibiting a cross section of for example 30×10 mm, it being possible for the cross sections to be selected differently corresponding to the requirements. For such systems, the corresponding current paths have to be routed in the housing short-circuit-proof, this being ensured by exemplary embodiments of the present invention. The present busbar adapter is, for example, designed for supply leads whose conductor cross section can vary from 1.5 mm$^2$ to 2.5 mm$^2$ up to 16 mm$^2$ (or 4, 6, 10 mm$^2$). The contact connections are routed short-circuit-proof in the busbar adapter due to the dividing walls. The freely running supply leads, however, are not short-circuit-proof.

For a 630 A busbar for example, the short-circuit current can exhibit a value of more than 25,000 A, the i$^2$t value being more than 5,000,000 A's. Such high prospective values would destroy the unprotected supply leads and the appliances connected thereto in the case of a short circuit. For example, the copper of the supply leads would melt and evaporate. For the fuses up to 63 A that are utilized in the present busbar adapter, only a maximum i$^2$t value of 21,200 A's is possible in the case of a short circuit, since they switch off a short circuit within 0.1 ms and limit the prospective high values to this low level. Due to this strong limitation, the supply leads that are weak in comparison to the busbars are sufficiently protected. Since a conductor cross section of 1.5 mm$^2$ withstands 29,000 A's, a reliable protection is guaranteed in this way. If for example only one 25 A fuse is inserted, the maximum i$^2$t value would only amount to 4,000 A's. For other fuses (e.g. for 2 A, 4 A, 6 A, 10 A, 16 A, 25 A, 32 A, 35 A, 40 A, 50 A), these values deviate further.

A further advantage of the busbar adapter according to the present invention is its integral design, wherein all current-carrying components are arranged in a housing structure and separated from each other by housing walls and fuses are correspondingly integrated along the current paths.

BRIEF DESCRIPTION OF THE DRAWINGS

The invention is described in more detail below with reference to the accompanying figures. In the figures:

FIG. 11 shows a cross-sectional view and a top view of the removed fuse deck.

DETAILED DESCRIPTION OF THE PREFERRED EMBODIMENTS

Figure 1:
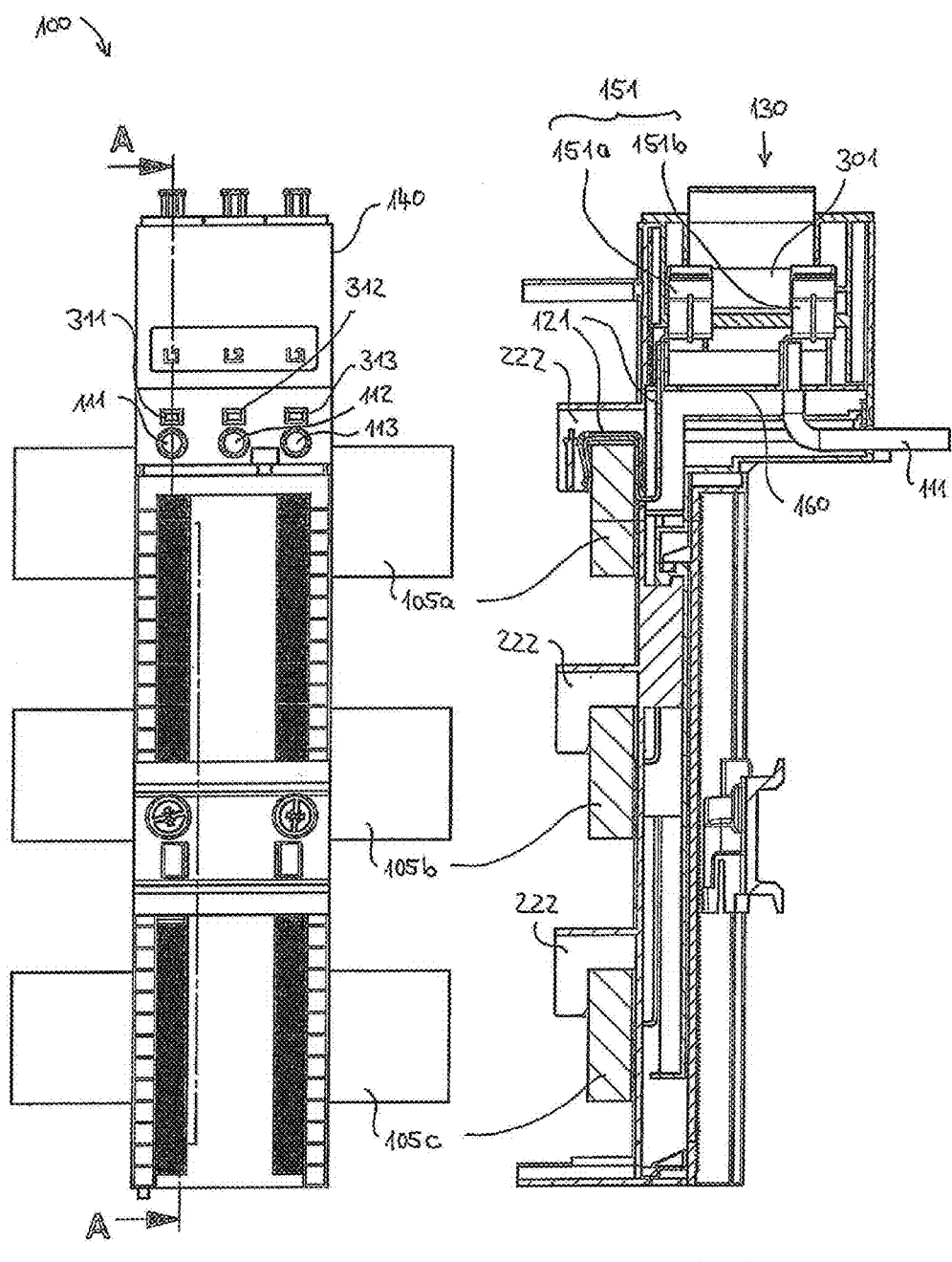
FIG. 1 shows a busbar adapter according to an exemplary embodiment of the present invention.

In the figures, identical, similar or identically acting features have been marked with the same or similar reference characters, these features often being described only once and the corresponding descriptions can therefore refer to several figures.

FIG. 1 shows a busbar adapter 100 for contacting a first busbar 105a, a second busbar 105b, and a third busbar 105c, a top view being shown on the left and a cross-sectional view being show on the right through the cross-sectional plane A-A. The busbar adapter 100 exhibits a housing structure 140 in which a fuse unit 130 is arranged, the fuse unit 130 in the illustrated cross-sectional view exhibiting a first fuse holder 151 for holding the first fuse 301. A second and third fuse holders are not visible in FIG. 1. The busbar adapter 100 exhibits three openings through which a first, second and third supply leads 111, 112, 113 extend that are in turn connected by the busbar adapter 100 to the three busbars 105a, 105b, 105c via the first, second and third fuses.

In the cross-sectional view A-A shown on the right, the connection is visible between the first supply lead 111 and the first busbar 105a, the first supply lead 111 entering the housing structure 140 via a first opening and contacting a first fuse holder 151. On the other hand, the first busbar 105a is immobilized by a busbar holder 222 and contacted by a first contact connection 121 that in turn is connected to the first fuse holder 151. The fuse holder 151 exhibits a first contact 151a and a second contact 151b between which the first fuse 301 can be inserted, the second contact 151b being connected to the first supply lead 111 and the first contact 151a being connected to the first contact connection 121. After inserting the first fuse 301, a first current path is formed from the first busbar 105a to the first holder 151 via the first contact connection 121 and to the first supply lead 111 via the first fuse 301. The first fuse 301 itself does not have to be part of the busbar adapter according to the present invention.

The power supply, as it is shown in the cross-sectional view A-A, is designed in a similar way also for the connection between the second busbar 105b and the second supply lead 112, it being possible for the second fuse 302 to be inserted between the second busbar 105b and the second supply lead 112, so that a second (protected) current path is formed after inserting the second fuse 302. The same holds for the third busbar 105c that is connected to a third fuse holder via third contact connection (not shown in FIG. 1), into which holder a third fuse 303 can be inserted to thereby provide a third (protected) current path between the third busbar 105c, via the third contact connection, the third fuse up to the third supply lead 113.

In the present application, the term "housing structure 140" or "housing" encompasses all holding structures or holding frames to which the individual components can be attached without necessarily offering a visual cover, a dust protection, or a moisture protection. The housing structure 140 is to offer above all a support and an insulating protection for the components formed therein. The housing structure offer in particular an insulating protection for the first to third current paths, for which purpose, for example, insulating walls 160 are formed such as they are described below in the figures. The housing exhibits in particular a material that is stable so as to withstand unintended interference from outside, and exhibits a closed form so that, for example, a screwdriver cannot get into the interior of the housing.

Figure 2:
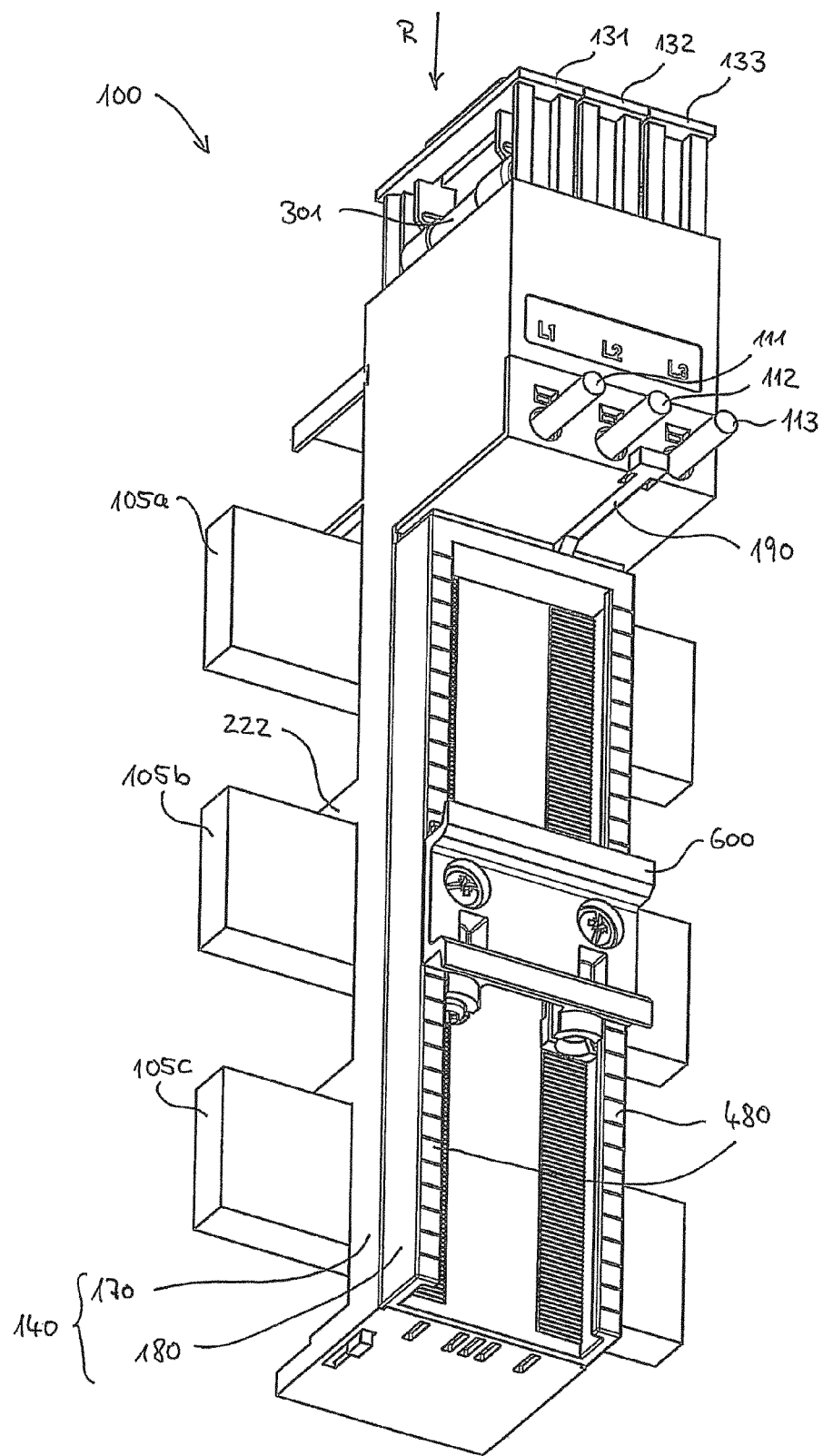
FIG. 2 shows a three-dimensional view of the inventive busbar adapter.

FIG. 2 shows a three-dimensional view of the inventive busbar adapter 100 having the housing structure 140 and having the first supply lead 111, the second supply lead 112, and the third supply lead 113, that are electrically connected in each case to the first busbar 105a, the second busbar 105b, and the third busbar 105c via the first to third current paths. A fuse (i.e. the first fuse 301, the second fuse 302, and the third fuse 303) is in each case formed along the individual current paths.

In the form shown, the fuse unit 130 can be withdrawn from the housing structure 140 at least partly, each individual fuse being withdrawable individually, so that the fuses can be replaced individually. For example, the first fuse 301 is disposed in a first slider 131 that is open at two opposite sides at right angles to the insertion direction R, so that it is easy for a user to remove the first fuse 301. In addition, the fuse unit 130 is accommodated in an integral housing structure 140 in the illustrated exemplary embodiment and can as such (apart from the sliders) not be separated from it (the same holds for the second and third fuses that cannot be seen in the illustration shown).

In the illustrated exemplary embodiment, the housing structure 140 exhibits a lower-deck element 170 and an upper-deck element 180, it being possible for the two deck elements 170, 180 to be connected with each other releasably via a locking device 190 and to be released.

The lower-deck element 170 comprises the fastening elements 222 for fastening the busbar adapter 100 on the busbars 105, the busbar adapter 100 illustrated in the figures being an adapter for a three-pole system, so that a total of three fastening elements 222 are provided for fastening to a total of three contact connections for busbars 105. The upper-deck element 180 comprises holding webs 480 that run in the longitudinal direction (vertically in FIG. 2) on top of which a support rail 600 is fastened that can be attached to the upper-deck element 180 in different positions and serves for receiving electrical appliances, in particular electrical installation appliances. Further details for the upper-deck element 180 and the lower-deck element 170 are not illustrated, since they are of no importance for understanding the present invention.

In the illustrated exemplary embodiment, the fuse unit 130 is integrated into the lower-deck element 170, and releasing the upper-deck element 180 from the lower-deck element 170 using the locking device 190 is described in more detail further below.

Figure 3:
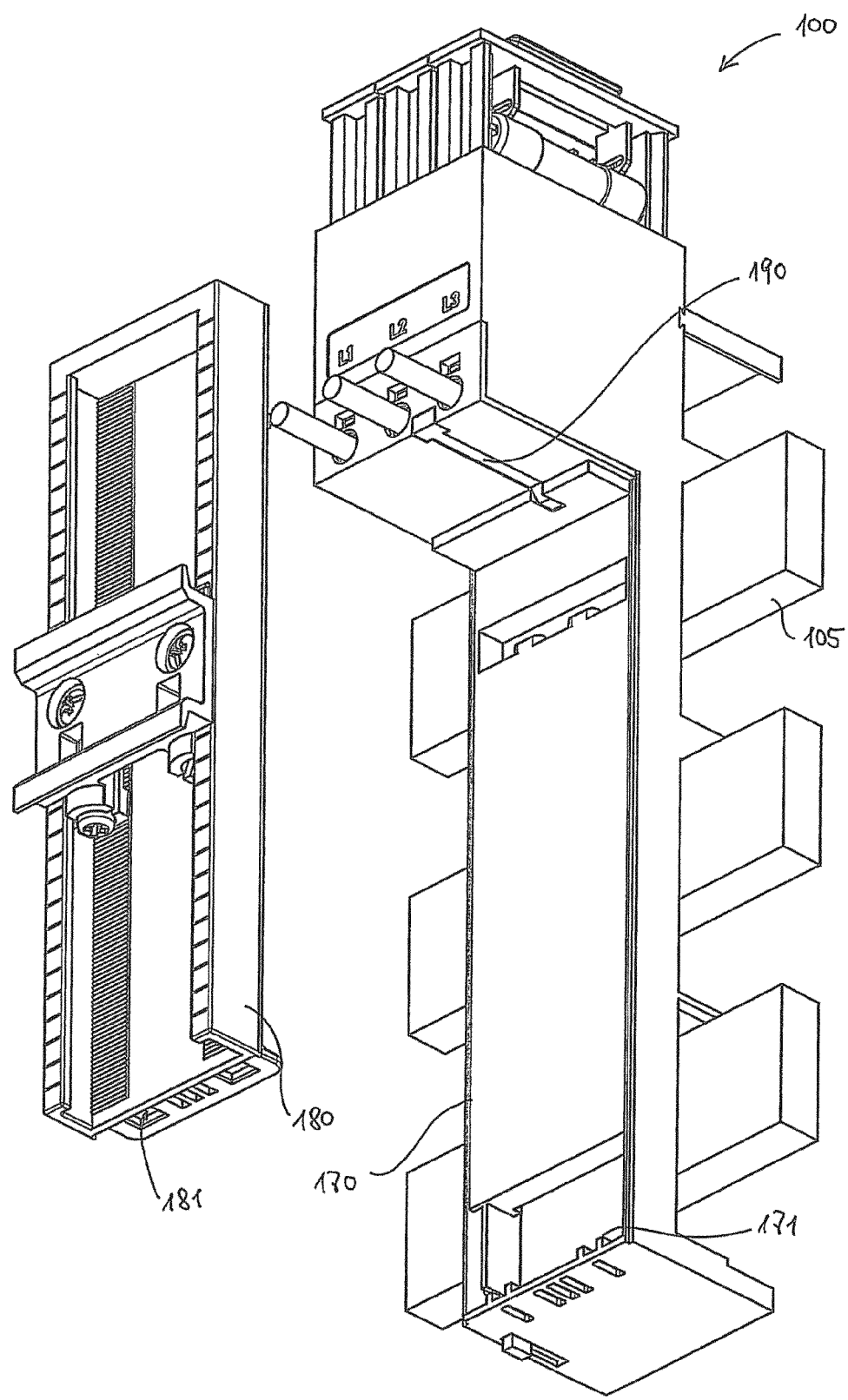
FIG. 3 shows a busbar adapter having a removable upper deck.

FIG. 3 shows the busbar adapter 100 as it can be seen in FIG. 2, but with the upper-deck element 180 removed, the locking device 190 having been actuated for removing the upper-deck element 180. For this purpose, the locking device 190 is designed as a slider, so that by sliding downward (in the direction toward the busbars 105) the upper-deck element 180 can be moved parallel to the lower-deck element 170 in a plane formed by the three busbars 105 and an opening 181 of the upper-deck element 180 can detach itself from a projection 171 on the lower-deck element 170 and so be removed (for further details see FIGS. 5 to 7).

Figure 4:
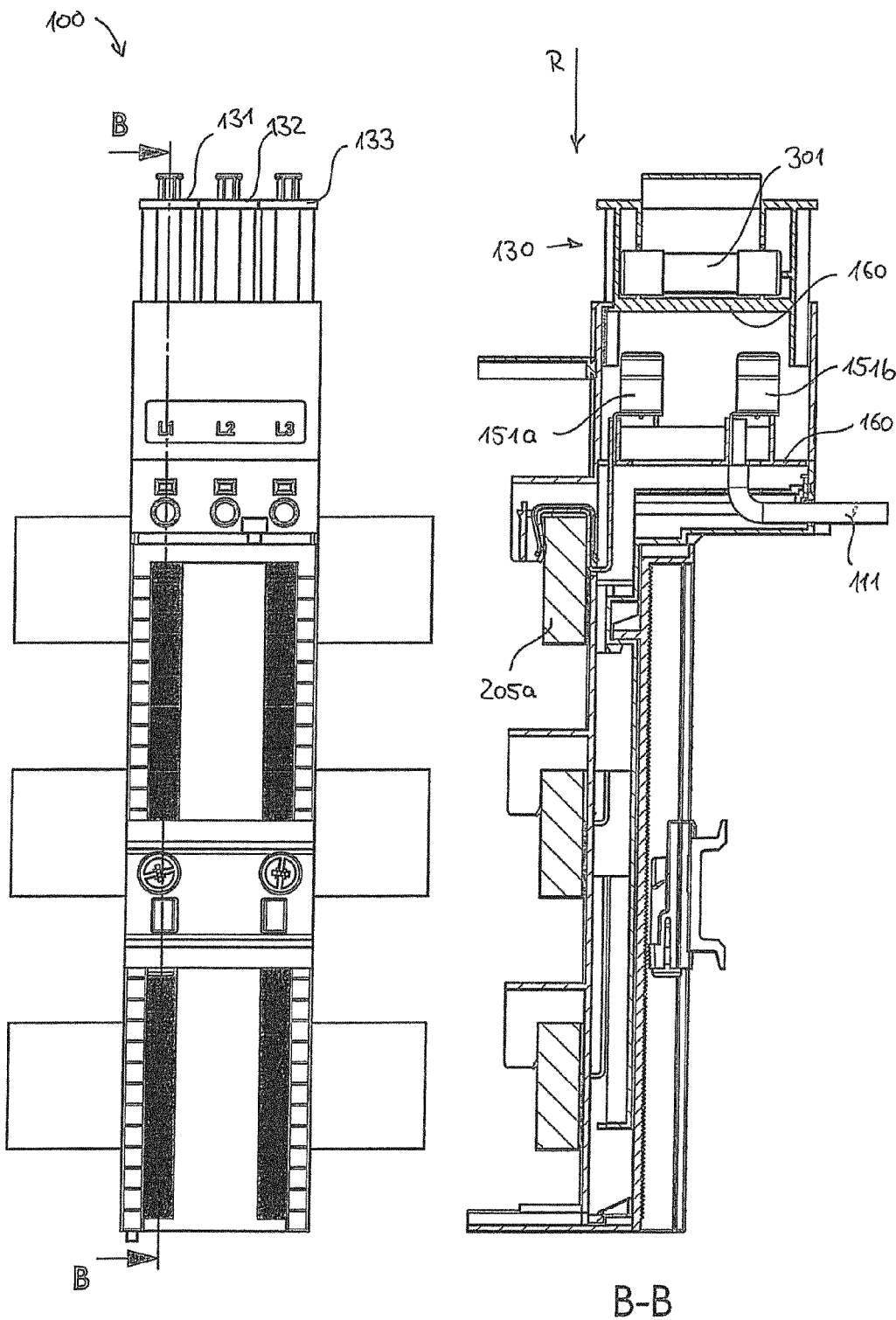
FIG. 4 shows a busbar adapter having withdrawable fuses.

FIG. 4 shows a top view and a cross-sectional view of a busbar adapter 100, the cross-sectional view being identical to the cross-sectional view of FIG. 1. The fuse unit 130 again exhibits three sliders 131, 132, 133 that have all been pulled out, so that all current paths between the supply leads 111, 112, 113 and the busbars 105 are interrupted. Only by pushing-in the three sliders 131, 132, 133 in the insertion direction R, the first fuse 301 (that is shown in the cross-sectional view B-B) connects the first contact 151*a* of the first fuse holder 151 to the second contact 151*b* of the first fuse holder 151, so as to close the first current path between the first supply lead 111 and the first busbar 105*a*.

The first fuse 301 in the first slider 131 is, for example, supported only in terms of the insertion direction R respectively counter to the insertion direction R, but not at right angles thereto (at right angles to the drawing plane of the cross-sectional view B-B), so that it is easy for a user to remove the first fuse 301. After insertion, the first fuse 301 is immobilized by the fuse holder. Furthermore, both the fuse unit 130 and also the housing structure 140 can exhibit insulating walls 160 that are designed so as to isolate the current paths from each other respectively to protect the current paths against unintended outside intervention.

Figure 5:
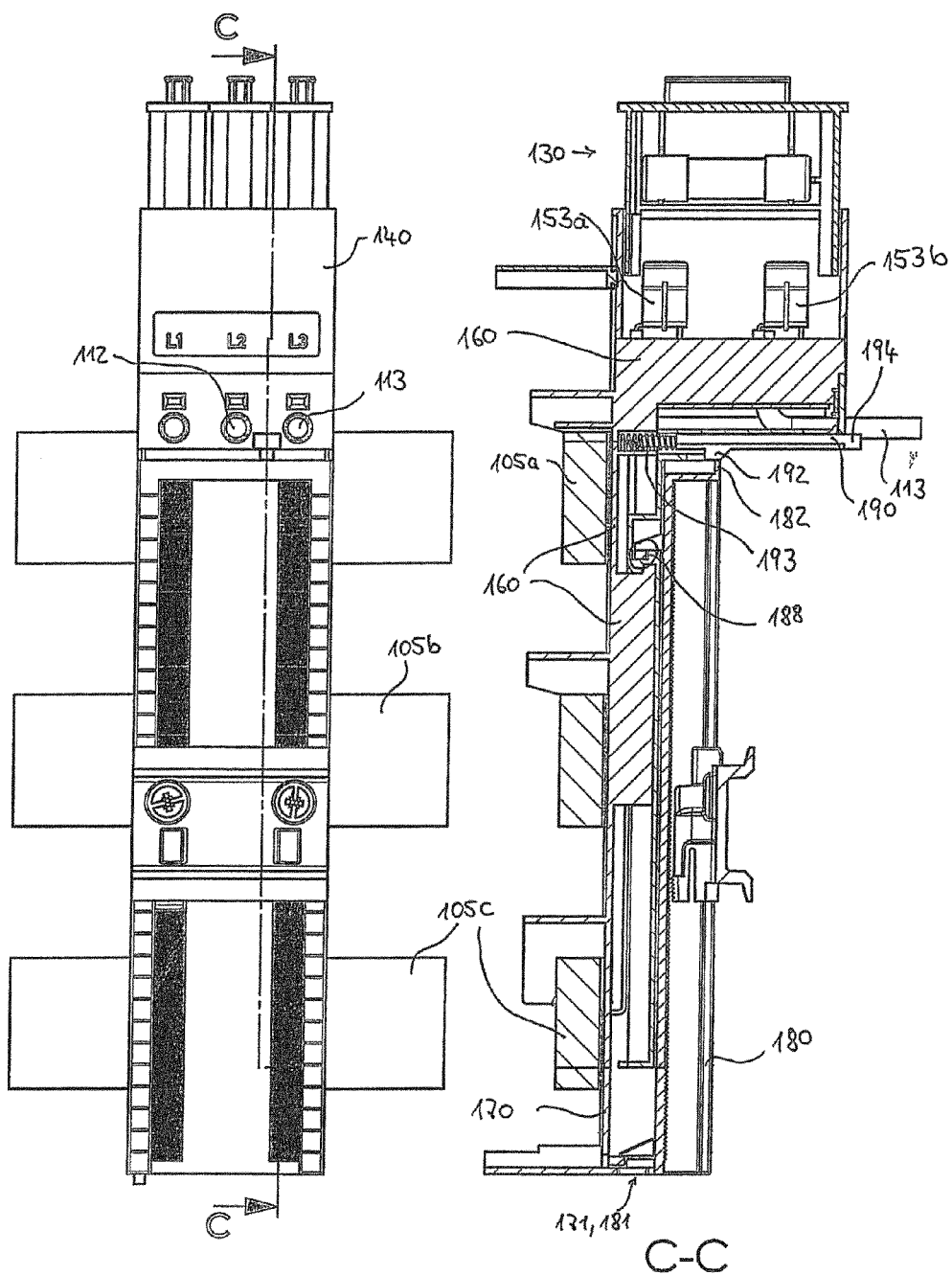
FIG. 5 shows further details regarding immobilizing the removable upper deck of the busbar adapter.

FIG. 5 shows a cross-sectional view C-C that is positioned between the second supply lead 112 and the third supply lead 113, the fuses again having been withdrawn from the housing structure 140 together with the sliders of the fuse unit 130 so that the current paths are interrupted.

The cross-sectional plane C-C in FIG. 5 is positioned such that it passes one of the insulating walls 160 that isolates the second current path that connects the second supply lead 112 to the second busbar 105*b*, from the third current path that connects the third supply lead 113 to the third busbar 105*c*. In this way, the insulating wall 160 has the effect that even if the second supply lead 112 or the third supply lead 113 are formed by a flexible material (e.g. a wire), these two supply leads cannot contact each other and are held at a safe distance from each other. The illustrated insulating wall 160 extends along the entire length along which the second and the third current paths extend parallel to each other, and in this way guarantees safe insulation. In this way, in particular the section that extends from the third fuse holder 153 having the contacts 153*a*, 153*b* to the third busbar 105*c* is completely embedded in the housing structure 140 so that unintended bridging is ruled out by the selected arrangement.

Furthermore, the cross section of FIG. 5 runs through the locking device 190 that is in its locking position and that prevents the upper-deck element 180 shifting relative to the lower-deck element 170 in a direction parallel or anti-parallel to the longitudinal axis of the lower-deck element 170. The locking device 190 comprises the locking slider that is fastened to the lower-deck element 170 and is biased by means of a spring 193 (or spring device) into the locking position. As FIG. 5 clearly shows, the locking slider is in its upper position (in FIG. 5 toward the left), i.e. in the locking position. In this state, a projection 192 of the locking slider 190 is situated in front of an edge 182 of the upper-deck element 180 in such a way that shifting of the upper-deck element 180 in a direction parallel or anti-parallel to the longitudinal axis of the lower-deck element 170 (upward in FIG. 5) is reliably prevented, so that the upper-deck element 180 cannot be removed from the lower-deck element 170.

The upper-deck element 180 and the lower-deck element 170 exhibit a first latching mechanism 188 that effects engagement of the upper-deck element 180 and of the lower-deck element 170 in each other when both deck elements are in the locked position. The first latching mechanism 188 is for example designed such that a projection is formed on the lower-deck element 170 and a depression on the upper-deck element 180, the projection of the lower-deck element 170 engaging into the depression of the upper-deck element 180 and both being able to be released from each other only if the upper-deck element 180 is shifted laterally relative to the lower-deck element 170. In a similar way, the second latching mechanism 171, 181 is designed such that the projection 171 projects from the lower-deck element 170 into the depression or opening 181 of the upper-deck element so that release is only possible if the upper-deck element 180 is shifted laterally relative to the lower-deck element 171 (see FIG. 3). The first and second latching mechanisms 188, 171/181 are here arranged laterally offset relative to each other on the upper-deck element 180 and the lower-deck element 170. For example, one of the latching mechanisms can be formed on an end face of the upper-deck element 180 and of the lower-deck element 170.

Figure 6:
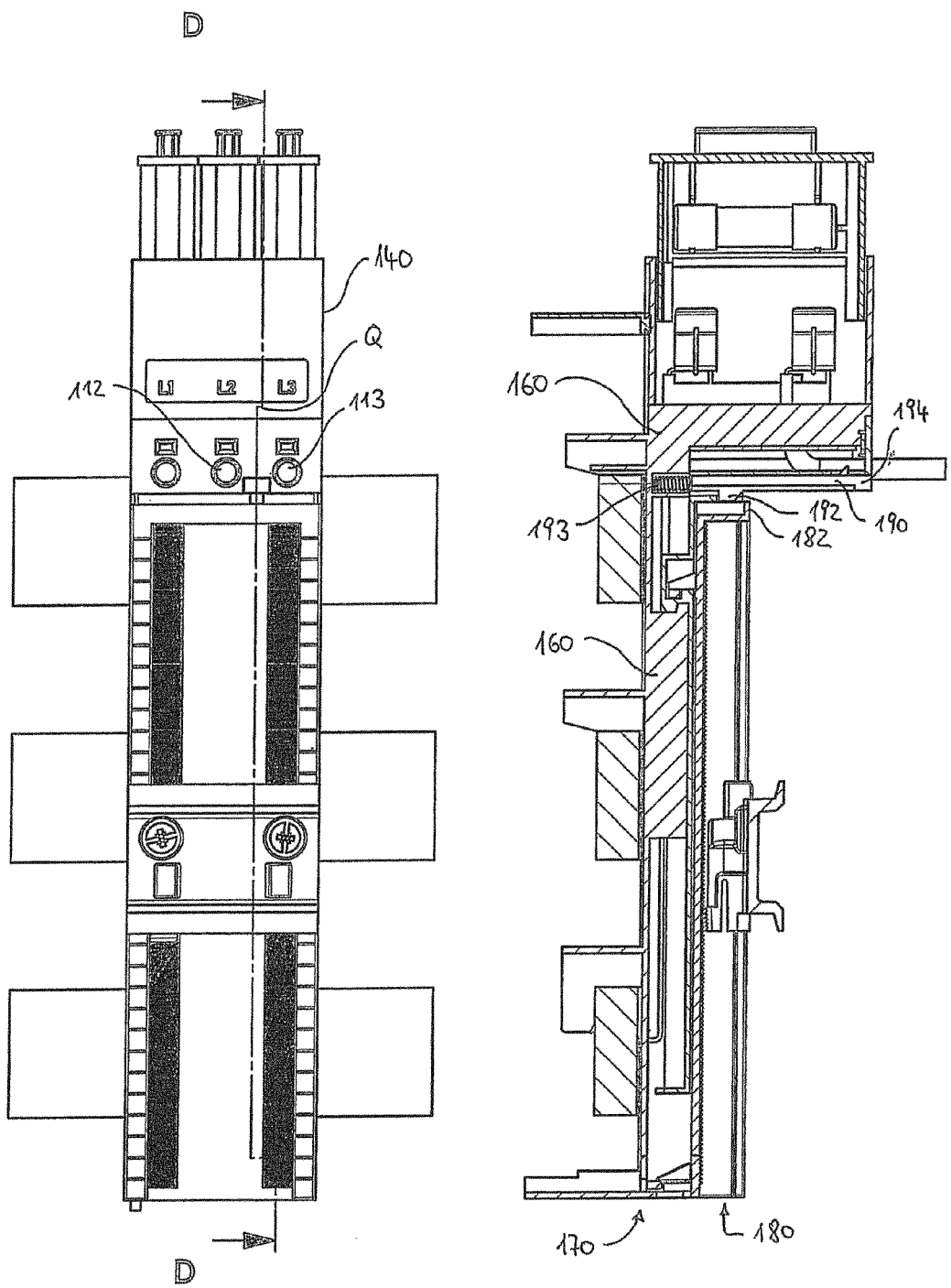
FIG. 6 shows a further cross-sectional view of the inventive busbar adapter through one of the insulating walls of inventive design.

FIG. 6 shows a further cross-sectional view along the cross-sectional lines D-D that again extends between the second and third current paths, the locking device 190 of FIG. 5 being in its unlocked position in FIG. 6. This can be achieved by a user pressing a further projection 194 in the direction of the lower-deck element 170 (toward the left in FIGS. 5 and 6), so that the locking slider 190 is pressed in the direction toward the lower-deck element 180 counter to the spring tension of the spring 193, so that the projection 192 likewise is moved toward the left and the edge 182 of the upper-deck element 180 can now be moved in the direction toward the longitudinal axis of the lower-deck element 170 (upward in FIGS. 5 and 6), and the upper-deck element 180 can be removed from the lower-deck element 170.

All further elements are analogous to the exemplary embodiment shown in FIG. 5, the insulating wall 160 in the cross-sectional view D-D only appearing shortened, since the cross section D-D was shifted at the place Q. The side walls 160 can, for example, also be designed (as also in the other figures) in the sliders 131, 132, 133, so that the first slider 131, the second slider 132, and the third slider 133 are isolated from each other when the first slider 131, the second slider 132, and the third slider 133 are inserted into the housing structure 140. This achieves complete and reliable isolation of the entire current paths by insulating walls 160 of the housing structure 140.

Figure 7:
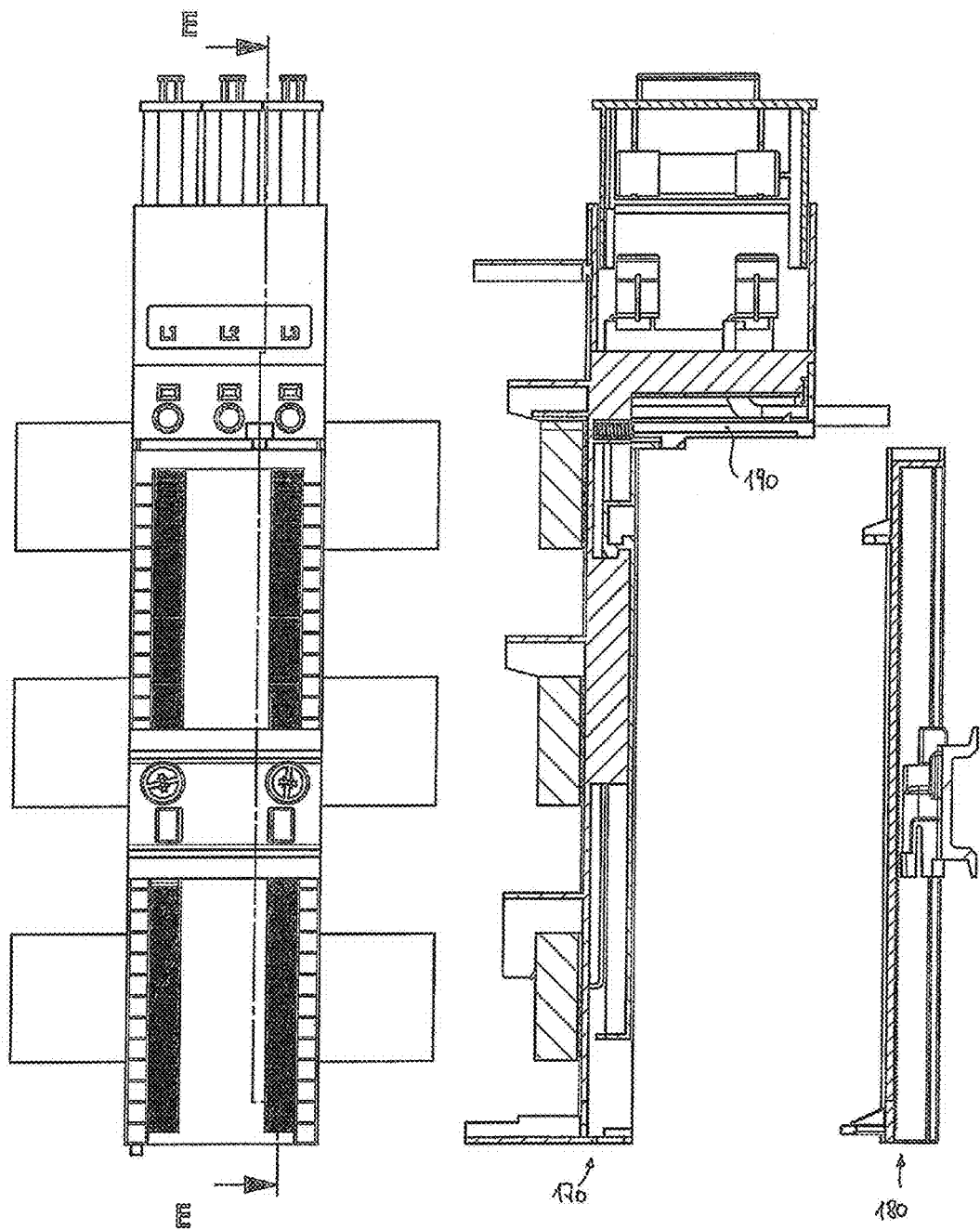
FIG. 7 shows the busbar adapter having a removed upper deck after releasing an inventive locking device.

FIG. 7 shows a cross-sectional view E-E that differs from the view illustrated in FIG. 6 only in that the upper-deck element 180 was removed from the lower-deck element 170, in that the locking device 190, as can be seen in FIG. 6, was pressed down by a user so that the latching between the upper-deck element 180 and the lower-deck element 170 is released. All further details are analogous to the previously described exemplary embodiments.

Figure 8:
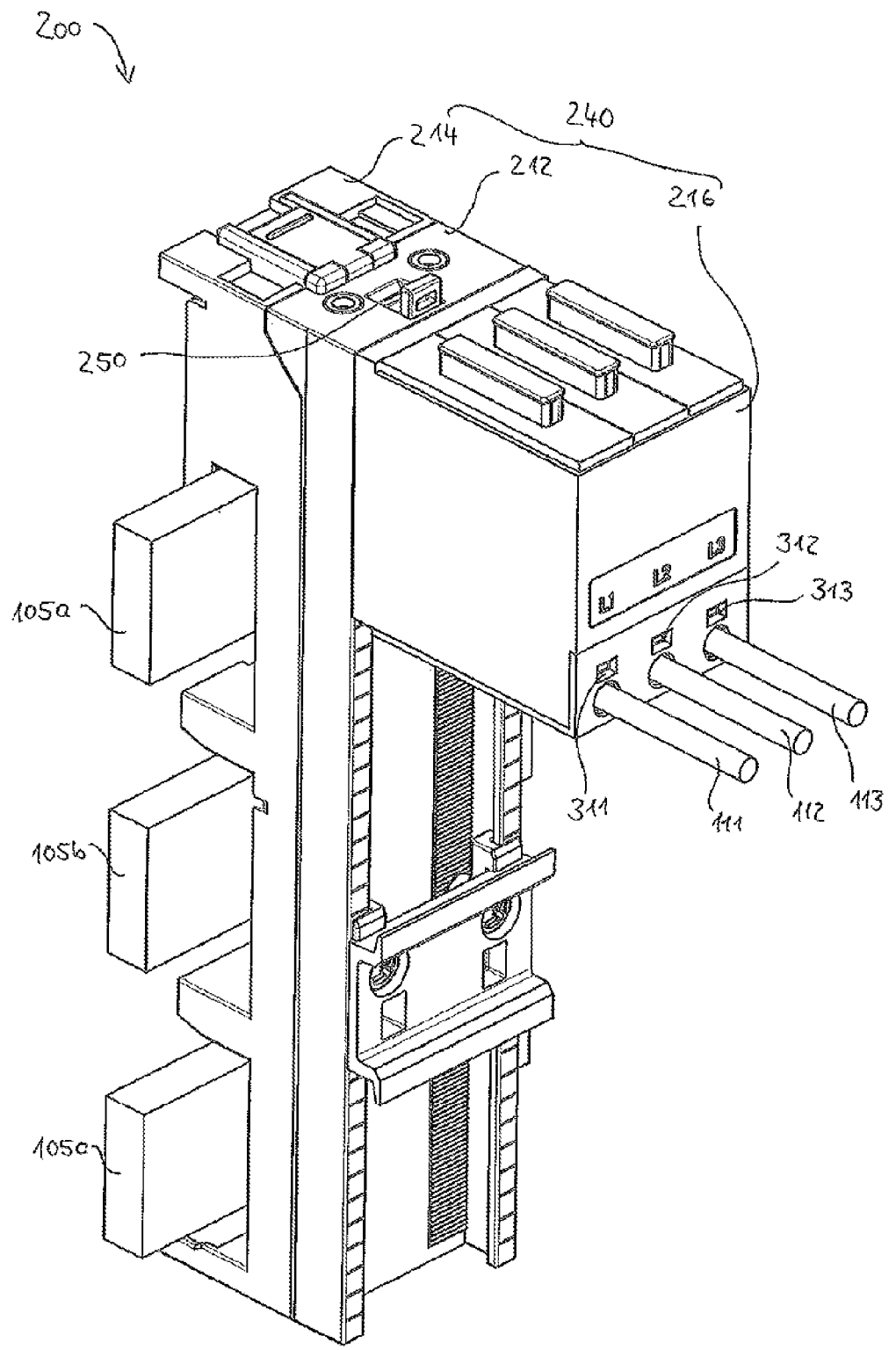
FIG. 8 shows a busbar adapter having a placed-on fuse unit in a fuse deck.

FIG. 8 shows a further exemplary embodiment for a busbar adapter 200 where the housing structure 240 exhibits a lower deck 214, an upper deck 212, and a fuse deck 216, the fuse deck 216 being removably connected to the lower deck 214 and the upper deck 212 and exhibiting the fuse unit 130.

By re-arranging the fuse unit 130 into a separate fuse deck 216, in this exemplary embodiment both the upper deck 212 and also the lower deck 214 are of different design than the previously described deck elements. In this exemplary embodiment, the upper deck 212 is arranged between the lower deck 214 and the fuse deck 216. The upper and lower decks 212, 214 for example exhibit an identical lateral extent and all deck parts are connected to each other individually, for example by means of separate locking mechanisms. Further details of the fuse deck are described using FIGS. 9-11.

Figure 9:
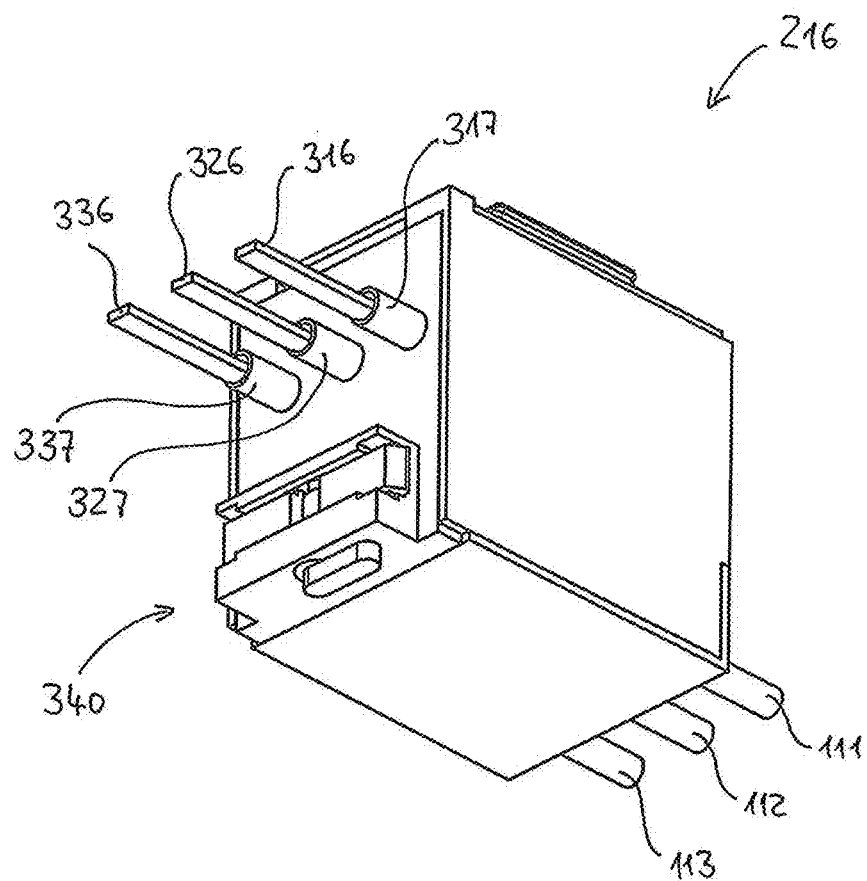
FIG. 9 shows a removed fuse deck of the busbar adapter according to FIG. 8.

FIG. 9 shows the fuse deck 216 from FIG. 8 after being removed from the upper and lower decks 212, 214. The fuse deck 216 exhibits the first supply lead 111, the second supply lead 112, and the third supply lead 113. The fuse deck 216 further exhibits a first contact element 316, a second contact element 326, and a third contact element 336. The first contact element 316 is connected to the first supply lead 111 via a first (protected) current path, the second contact element 326 is connected to the second supply lead 112 via a second (protected) current path, and the third contact element 336 is connected to the third supply lead 113 via a third (protected) current path. The protected current paths in turn are protected using fuses, as described above. The first contact element 316 can be inserted into a first opening (not shown) of the upper deck 212, the second contact element 326 can be inserted into a second opening of the upper deck 212, and the third contact element 336 can be inserted into a third opening of the upper deck 212. The first to third contact elements 316 to 336 can establish a contact with the upper deck 212 or the lower deck 214 via a lever element 250 such as it is shown in FIG. 8 on a side wall.

In FIG. 8, the upper deck 212 and the lower deck 214 are in turn connected to each other via a latching mechanism that provides a releasable connection. The latching mechanism can be designed such as it is described in FIGS. 5 to 7. The further details of this latching mechanism are of no further importance for the invention and are therefore not described.

Contacting the fuse deck 216 by means of the lever element 250 can take place via spring clips so that contacting the first contact element 316 with the first contact connection 121 and contacting the second contact element 326 with the second contact connection 122 and the third contact element 336 with the third contact connection 123 takes place simultaneously. As a result, the first to third supply leads 111 to 113 are in each case connected electrically to one of the busbars 105a-105c via three current paths.

The fuse deck 216, as it is shown in FIG. 9, further exhibits an optional immobilizing mechanism 340 that is designed, for example, to fasten the fuse deck 216 to the upper deck 212, so that a reliable support of the fuse deck 216 is made possible. So that the isolation of the current paths is improved further, the first to third contact elements 316, 326 and 336 in each case exhibit an insulating sleeve 317, 327, 337, so that current-carrying parts are only exposed where contacting takes places via the exemplary spring clips.

Figure 10A:
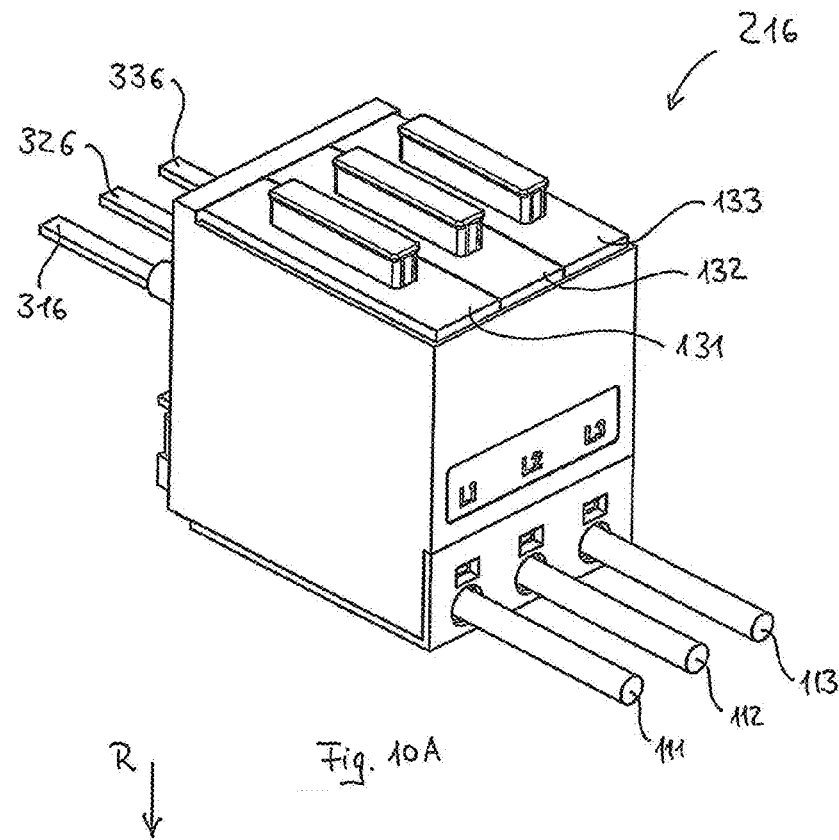
FIGS. 10A, B show further views of the removed fuse deck of FIG. 9.
Figure 10B:
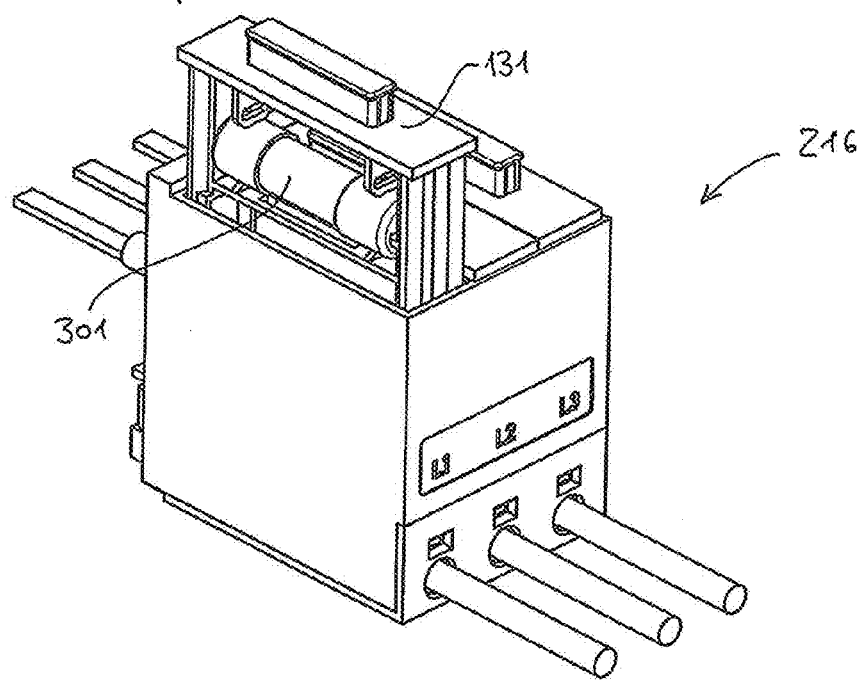

FIGS. 10A and 10B show further three-dimensional views of the fuse deck 216, the fuse deck 216 being visible from the side of the supply leads 111, 112, 113 in FIG. 10A. The fuse unit 130 in turn exhibits three sliders 131, 132, 133 that make it possible to withdraw individually the first to third fuses (not shown) so that the current path is interrupted in this way.

FIG. 10B shows an example where the first fuse 301 was pushed out of the fuse deck 216 via the first slider 121. The first slider (here, e.g. the first slider 131) is here again designed such that it is easy for a user to take out the first fuse 301 in a direction at right angles to the insertion direction R and that the slider only provides immobilization along the insertion direction R or counter to it. Further details of the fuse unit 130 do not differ from the fuse unit as it has been described above using FIGS. 1 to 7.

FIG. 11 shows a cross-sectional view along the cross-sectional line A-A of the fuse deck 216, the cross-sectional view extending through the first fuse 301 and showing the current path from the first supply lead 111 to the first contact element 316. Along the current path from the first supply lead 111, there at first takes place contacting of the fuse holder 151, that is visible in the figure only as a cross section and that, as previously, also exhibits a first and second contact 151a, 151b. The first fuse 301 connects the first contact element 316 via the first contact 151a of the fuse holder 151 to the second contact 151b of the fuse holder 151. This produces a first protected current path from the first supply lead 111 to the first contact element 316 via the first fuse 301, the current path being closed by pushing-in the first slider 131 of the fuse unit 130 and being opened by pulling-out the first slider 131 of the fuse unit 130. The second and third fuses in the second and third sliders 132, 133 are of identical construction so that here a repeated description can be dispensed with.

The features of the invention, disclosed in the description, the claims and the drawings, can be essential both individually and also in any combinations for the implementation.

What is claimed is:

1. A busbar adapter for contacting at least a first and a second busbar using at least a first fuse and a second fuse, the busbar adapter comprising: at least a first supply lead and a second supply lead; at least a first contact connection and a second contact connection for producing a connection to the at least two busbars; a fuse unit having at least a first fuse holder and a second fuse holder, the first and the second fuse holders for keeping the first fuse and the second fuse releasable, so that the first supply lead and the first contact connection are connected after inserting the first fuse into the first fuse holder, for providing a first current path, and the second supply lead and the second contact connection are connected after inserting the second fuse into the second fuse holder, for providing a second current path; and a housing structure for accommodating the fuse unit and the first and second contact connections, the housing structure having insulating walls that are arranged such that the first current path is isolated from the second current path; wherein the fuse unit has at least one withdrawable slider that is arranged to withdraw at least one of the first fuse and the second fuse out of the fuse unit, to open the first and second current paths.

2. The busbar adapter according to claim 1, wherein the at least one withdrawable slider is a first slider for withdrawing the first fuse and the fuse unit further has a second slider for withdrawing the second fuse, the first and second sliders being withdrawable independently of each other, to thereby open the first and second current path independently of each other.

3. A busbar adapter for contacting at least a first and a second busbar using at least a first fuse and a second fuse, the busbar adapter comprising: at least a first supply lead and a second supply lead; at least a first contact connection and a second contact connection for producing a connection to the at least two busbars; a fuse unit having at least a first fuse holder and a second fuse holder, the first and the second fuse holders for keeping the first fuse and the second fuse releasable, so that the first supply lead and the first contact connection are connected after inserting the first fuse into the first fuse holder, for providing a first current path, and the second supply lead and the second contact connection are connected after inserting the second fuse into the second fuse holder, for providing a second current path; and a housing structure for accommodating the fuse unit and the first and second contact connections, the housing structure having insulating walls that are arranged such that the first current path is isolated from the second current path; wherein the housing structure has an upper deck and a lower deck and a fuse deck having the fuse unit for interconnecting the upper deck between the lower deck and the fuse deck so that the upper deck, the lower deck, and the fuse deck can be separated, and wherein the busbar adapter is for locking the upper deck, the lower deck, and the fuse deck with each other.

4. The busbar adapter according to claim 3, wherein the fuse deck has at least a first contact element and a second contact element and the upper deck and the lower deck have openings for receiving and immobilizing the first contact element and the second contact element.

5. The busbar adapter according to claim 4, wherein the housing structure further has a switch-locking mechanism for fastening the fuse deck to the upper deck and the lower deck after introducing the fuse deck having the first contact element and the second contact element into the openings of at least one of the upper deck and the lower deck so that the first current path is formed from the first supply lead via the first fuse via the first contact element to the first contact connection and the second current path is formed from the second supply lead via the second fuse, the second contact element to the second contact connection.

6. The busbar adapter according to claim 5, wherein one of the following two features 1 and 2 are present: the upper deck, the lower deck, and the fuse deck are lockable and unlockable via the switch-locking mechanism; and the fuse deck is fastened by an immobilizing mechanism to the upper deck.

7. A busbar adapter for contacting at least a first and a second busbar using at least a first fuse and a second fuse the busbar adapter comprising: at least a first supply lead and a second supply lead; at least a first contact connection and a second contact connection for producing a connection to the at least two busbars; a fuse unit having at least a first fuse holder and a second fuse holder, the first and the second fuse holders for keeping the first fuse and the second fuse releasable, so that the first supply lead and the first contact connection are connected after inserting the first fuse into the first fuse holder, for providing a first current path, and the second supply lead and the second contact connection are connected after inserting the second fuse into the second fuse holder, for providing a second current path; and a housing structure for accommodating the fuse unit and the first and second contact connections, the housing structure having insulating walls that are arranged such that the first current path is isolated from the second current path; a support rail for fastening electrical appliances thereto at different positions on the upper-deck element.

8. The busbar adapter according claim 3, further comprising a support rail for fastening electrical appliances thereto at different positions on the upper deck of the busbar adapter.

* * * * *